(12) United States Patent
Winterot et al.

(10) Patent No.: US 7,564,620 B2
(45) Date of Patent: Jul. 21, 2009

(54) OPTICAL ARRANGEMENT AND METHOD FOR THE IMAGING OF DEPTH-STRUCTURED OBJECTS

(75) Inventors: Johannes Winterot, Jena (DE); Tobias Kaufhold, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 271 days.

(21) Appl. No.: 11/467,235

(22) Filed: Aug. 25, 2006

(65) Prior Publication Data
US 2007/0047094 A1 Mar. 1, 2007

(30) Foreign Application Priority Data
Aug. 25, 2005 (DE) .................. 10 2005 040 830

(51) Int. Cl.
*G02B 21/00* (2006.01)
*G02B 13/00* (2006.01)
(52) U.S. Cl. .................. 359/381; 359/379; 359/744
(58) Field of Classification Search .................. 359/376, 359/377, 378, 379, 380, 381, 383, 676, 744
See application file for complete search history.

(56) References Cited

U.S. PATENT DOCUMENTS

| | | | | |
|---|---|---|---|---|
| 4,193,667 A | * | 3/1980 | Yasukuni et al. | 359/688 |
| 4,318,585 A | * | 3/1982 | Matsumura | 359/425 |
| 4,657,356 A | * | 4/1987 | Matsumura | 359/377 |
| 7,453,631 B2 | * | 11/2008 | Namii et al. | 359/377 |

* cited by examiner

*Primary Examiner*—Alessandro Amari
(74) *Attorney, Agent, or Firm*—Reed Smith LLP

(57) ABSTRACT

The invention is directed to an arrangement and a method for imaging depth-structured objects and for calibrating the imaging in connection therewith, preferably for generating stereoscopic images from different observation planes at different depth levels of an object. According to the invention, in an optical arrangement for imaging depth-structured objects comprising an entrance pupil, an aperture diaphragm, and a receiver surface positioned in the imaging beam path, at least one optical assembly which is displaceable in axial direction is provided between the aperture diaphragm and the receiver surface, and the displacement of this optical assembly within a predetermined length range causes a change in the focus position while the magnification remains the same. Accordingly, the idea of the invention consists in introducing an optical element between the aperture diaphragm and the receiver surface or using an existing optical element in such a way that the defocusing is compensated through its effect without causing a shifting of the image position.

13 Claims, 7 Drawing Sheets

OPTICAL ARRANGEMENT AND METHOD FOR THE IMAGING OF DEPTH-STRUCTURED OBJECTS

CROSS-REFERENCE TO RELATED APPLICATIONS

This application claims priority of German Application No. 10 2005 040 830.3, filed Aug. 25, 2005, the complete disclosure of which is hereby incorporated by reference.

BACKGROUND OF THE INVENTION a) Field of the Invention

The invention is directed to an arrangement and a method for imaging depth-structured objects and for calibrating the imaging in connection therewith, preferably for generating stereoscopic images from different observation planes at different depth levels of an object.

b) Description of the Related Art

Particularly when imaging depth-structured objects with a non-telecentric entrance pupil position, different depths are imaged with different imaging scales. Further, asymmetric pupil positions can lead to lateral effects. Special measurement systems use telecentric beam delivery to avoid this effect. Knowledge of the distortion characteristic and displacement characteristic in such systems with non-telecentric entrance pupil position is necessary for managing measurement tasks and for the superposition of images from different depths. This information must be gained from test recordings of known structures.

One problem in this respect consists in the blurriness of the images which is caused by defocusing and which is directly related to the different distance between object planes. Shifting of the image position and distortion are defined by the bundle shaping of imaging beams proceeding from an object point through the aperture diaphragm. The unification of the imaging beams in the image plane is disrupted by defocusing, and the blurry images make it more difficult to determine the image positions and, therefore, the parameters for calibration.

It is known to use stereo microscopes to obtain three-dimensional image information from an object to be observed. For this purpose, two-dimensional images are recorded stepwise from different focus planes. The stack of two-dimensional images formed in this way contains the three-dimensional image information of the object.

However, for the reasons mentioned above, the images are distorted in an unwanted manner when passing through the optical systems. The degree of this distortion depends on the geometric-optical imaging characteristics of the objective and the subsequent imaging system, on the size of the lateral offset between the optical axis of the objective and the subsequent imaging system, and on manufacturing defects.

The design-dependent systematic distortion can be canceled out almost completely by mathematical methods. The distortion can be characterized by evaluating the changes in the lateral image coordinates of objects with images neighboring one another with respect to depth, that is, images which are recorded with different object focusing. However, the accuracy of this evaluation is impaired and limited by the blurriness that is inevitably associated with refocusing.

Further, it is known to solve the problem of preventing the energy loss that is caused in stereo-microscope recordings of fluorescence images by color cameras by recording a series of images with a monochrome camera and superimposing the images of this series additively and with colorization. However, the residual errors of the longitudinal chromatic aberration results as blurriness in individual images due to defocusing.

In devices of known construction, compensation of blurriness by refocusing the stereo microscope inevitably leads to a lateral shift and to a change in the lateral image distances. If this influence is corrected by image processing, portions of the image for superposition are lost due to the lateral shift. Mechanical compensation by displacement of the object and adaptation of the imaging scale is complicated.

It is desirable to eliminate this negative effect through suitable possibilities for focus correction.

OBJECT AND SUMMARY OF THE INVENTION

On this basis, it is the primary object of the invention to provide an optical arrangement which is suitable particularly for recording a series of images of an object at different object distances and in which it is possible to correct defocusing when adjusting different object distances and the consequences thereof in a simple manner.

This object is met for an optical arrangement for imaging depth-structured objects comprising an entrance pupil, an aperture diaphragm, and a receiver surface positioned in the imaging beam path in that at least one optical assembly which is displaceable in axial direction is provided between the aperture diaphragm and the receiver surface, and the displacement of this optical assembly within a given length range causes a change in the focus position while the magnification remains the same.

In this connection, the entrance pupil can be situated in a non-telecentric position.

Accordingly, the idea of the invention consists in introducing an optical element between the aperture diaphragm and the receiver surface or using an existing optical element in such a way that the defocusing is compensated through its effect without causing a shifting of the image position.

Further, this optical element can be used according to the invention in such a way that images of one and the same object plane which are imaged out of focus because of longitudinal chromatic aberration in the receiver surface are sharply imaged successively in time on the receiver surface whose position is unchanged. In so doing, effects known from object-side focusing are eliminated.

The optical arrangement according to the invention can be applied, e.g., for focus correction in auxiliary telecentric measurement devices, in non-telecentric symmetric observation devices such as macroscopes, and in non-telecentric asymmetric beam delivery in stereo microscopes.

A typical application for imaging with a non-telecentric, asymmetric entrance pupil position is image recording in one channel of a telescope-type stereo microscope. Therefore, the further disclosure of the solution according to the invention and the description of the embodiment examples make use of the example of a stereo microscope of this kind, although the invention is not limited to this.

Consequently, the optical arrangement according to the invention is preferably constructed as a stereo microscope in which optical assemblies which are displaceable in axial direction are provided between the aperture diaphragm and the receiver surface and whose displacement within a given length range causes a change in the focus position while the magnification remains the same.

In a first construction, afocal magnification changers are provided for adjusting the desired magnification, and the displaceable optical assemblies are lenses or lens groups of these magnification changers.

For example, it is conceivable to use an afocal magnification changer comprising four lens groups LG11, LG12, LG13 and LG14, wherein lens group LG11 is contiguous to the infinity space to the microscope objective and lens group LG14 is contiguous to the infinity space to the tube lens, the aperture diaphragm lies between the two, and lens group LG14 is displaceable within a length range of about ±1 mm extending in axial direction without causing a change in the magnification that is pre-selected by this magnification changer.

In this way, it is possible to carry out a correction of the focus position in the object by displacement of the lens group LG14. The change in the focus position is related to the displacement of the lens group LG14 by the following equation:

$$\Delta Z = \Delta a * [(f'_{LG14} * \text{magnification} * \text{objective magnification})/\text{objective focal length at objective magnification } 1\times]^2,$$

where $\Delta Z$ is the change in the focus position in Z-direction, $\Delta a$ is the distance between the lens groups LG13 and LG14 in axial direction, $f'_{LG14}$ is the focal length of lens group LG14, magnification is the telescope magnification pre-selected by the magnification changer.

To illustrate the independence of the magnification from the change in position of lens group LG14, the focused total imaging from the object to the image in the optical space in front of lens group LG14 is thought of as continuous. The object is imaged in the object-side focal point of lens group LG14. Lens group LG14 and the tube lens together correspond to an optical finite-finite system, and they image the object-side focal point of lens group LG14 in the image-side focal point of the tube lens. The back focus between the two systems (lens group LG14 and tube lens) is infinite. The following equation applies to the magnifications:

$\beta'$=focal length of tube lens/objective focal length with objective magnification 1×*magnification*objective magnification The following partial magnification applies to the finite-finite system comprising lens group LG14 and tube lens:

$\beta'_2$=focal length tube lens/focal length $LG14$

The magnification or imaging scale is not dependent on the distance between the lens group LG14 and tube lens.

The imaging system from the object to the optical space in front of lens group LG14 comprises two parts, namely, the objective and the portion of an afocal magnification changer in front of lens group LG14; it has a magnification-dependent focal length. The magnification and imaging scale are given by:

$\beta'_3$=−magnification*objective magnification/objective focal length with objective magnification 1×*focal length $LG14$ The focal length of the objective is given by:

$f'_{objective}$=objective focal length with objective magnification 1×/objective magnification The focal length of the part of the afocal magnification changer in front of lens group LG14 is:

$f'_4$=−magnification*focal length $LG14$.

When the distance from the object to the objective changes, an image which is created by the objective and the portion of the afocal magnification changer in front of lens group LG14 and which differs in position and size from the original, focused image is formed in the optical space in front of lens group LG14.

According to the invention, this image can now be moved into the object-side focal point of lens group LG14 by axial displacement of lens group LG14 and accordingly appears sharp in the original image plane. The change in magnification and the change in the lateral image position can be measured in the sharp image and are accessible to evaluation.

The focusing function for the recording of a plurality of images of an object plane with different wavelengths and longitudinal chromatic aberrations is explained in an analogous manner. The image of a wavelength with defocusing errors is not imaged in the object-side focal point of LG14 in the space in front of LG14. By displacing LG14, this difference is compensated and the image is formed in the desired receiver plane.

An embodiment example for a magnification changer of the type mentioned above is described in detail below. In this way, depending upon the magnification setting, between 10 and 30 wave-optical depth-of-field units can be superposed within the object, which is sufficient for calibrating the dynamics of the image points and also for compensating longitudinal chromatic aberrations.

This construction of the invention can also be realized, for example, with afocal magnification changers comprising five lens groups LG21 to LG25. Lens group LG21 is contiguous to the infinity space to the microscope objective, and lens group LG25 is contiguous to the infinity space to the tube lens. Lens group LG25 is displaceable in axial direction by about ±1 mm as will be explained in more detail in the following with reference to an embodiment example.

In a second construction of the invention, afocal magnification systems which are designed for a determined magnification which is not changeable per se are provided instead of the afocal magnification changers. The optical assemblies which are displaceable for purposes of changing the focus position are lenses or lens groups of these magnification systems. The aperture diaphragm of the system is located in front of the displaceable optical assemblies.

The lens group contiguous to the infinity space to the objective is fixedly positioned, while the second lens group contiguous to the infinity space to a first tube lens is displaceable in axial direction without causing a change in the magnification that is predetermined by this magnification system.

The length range in which displacement is possible can be ±0.5 mm as will be described in more detail in the following with reference to several embodiment examples. The change in the focus position within the object is given by the following equation:

$$\Delta Z = \Delta a * [(f'_{tube\ lens}/f'_{LG})^2/\beta'^2,$$

where $\Delta Z$ is the change in the focus position in Z-direction, $\Delta a$ is the distance between the two lens groups in axial direction, $f'_{tube\ lens}$ is the focal length of the tube, $f'_{LG}$ is the focal length of the displaceable lens group, $\beta'$ is the magnification from the object to the tube intermediate image.

When the distance from the object to the objective changes, an image which is created by the objective and the portion of the imaging system in front of the displaceable lens group and which differs in position and size from the original, focused image is again formed in the optical space in front of the group LG in this instance. Through axial displacement of the lens group LG, this image can be moved into the object-side focal point of the lens group LG and appears sharp in the original image plane. The change in magnification and the change in the lateral image position are measurable in the sharp image and are accessible to evaluation.

In a third construction of the invention, tube lens systems with changeable transmission length are provided for influencing the magnification of the object plane imaged in the tube intermediate image plane, and the displaceable optical assemblies are lenses or lens groups of these tube lens systems.

For example, a tube lens system can comprise three individual lenses whose second lens is axially displaceable between a stationary first lens and a third lens which is fixedly arranged near the eyepiece without this displacement causing a noticeable change in the focal length of the tube lens system.

As will be shown below with reference to a concrete embodiment example, displacement distances of ±9 m can be achieved. The change in the focus position within the object is $$\Delta Z = \Delta a/\beta'^2,$$

where $\Delta Z$ is the change in the focus position in Z-direction, $\Delta a$ is the change in the back focus of the tube lens system $\beta'$ is the magnification from the object to the tube lens intermediate image.

The invention will be described in more detail in the following with reference to several embodiment examples.

BRIEF DESCRIPTION OF THE INVENTION

DESCRIPTION OF THE PREFERRED EMBODIMENTS

Figure 1:
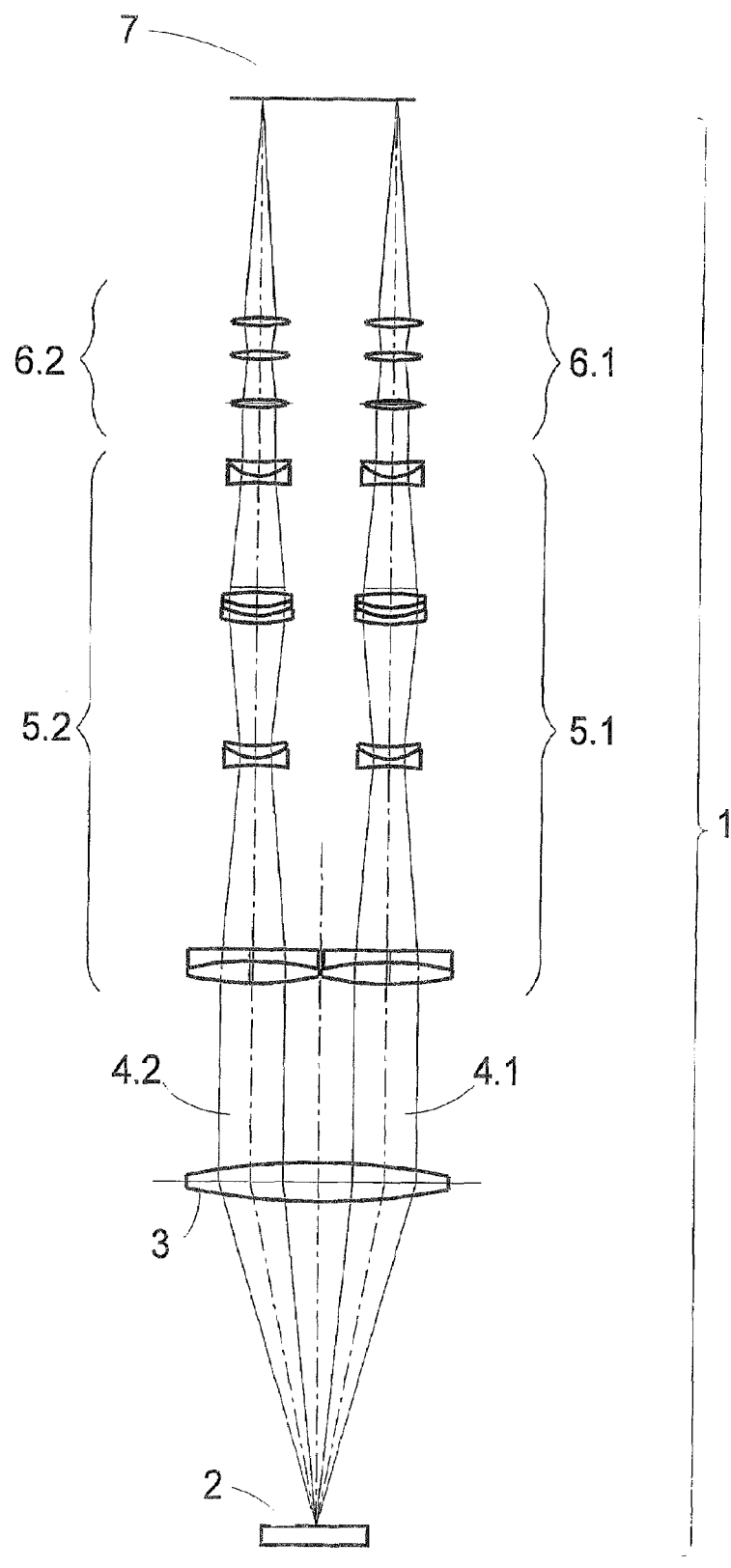
FIG. 1 shows the basic construction of a telescope-type stereo microscope.

FIG. 1 shows the basic construction of a stereo microscope 1 which is used, for example, to obtain two-dimensional images of an object 2 from different focus planes which, as an image stack, then supply three-dimensional image information about the object 2.

The stereo microscope 1 is a telescope-type stereo microscope and comprises an objective 3 through which the light coming from the object 2 passes in two imaging beam paths 4.1, 4.2. On the side of the objective 3 remote of the object 2, the imaging passes through magnification changers 5.1, 5.2.

By means of the magnification changers, different magnifications and imaging scales can be pre-selected for obtaining images.

Following the magnification changers 5.1, 5.2 in the imaging beam paths 4.1, 4.2 are lenses of tube lens systems 6.1, 6.2 and the receiver surface 7 of an image recording device.

In order to be able to adjust the focus position when recording an observation plane in the object 2 and to compensate for defocusing in the transition of the focus position from a first observation plane to a second observation plane, the stereo microscope 1 according to the invention has in at least one of the two imaging beam paths 4.1, 4.2 an optical assembly which is displaceable in axial direction, i.e., in direction of the optical axes of the imaging beam paths 4.1, 4.2 and whose displacement causes a change in the focus position but leaves the predetermined magnification unchanged.

As will be shown in the following, different constructions of this displaceable optical assembly are possible.

For example, a lens or lens group can be displaceable within one or two magnification changers 5.1, 5.2 by a given amount in axial direction relative to the rest of the lenses or lens groups.

Figure 2:
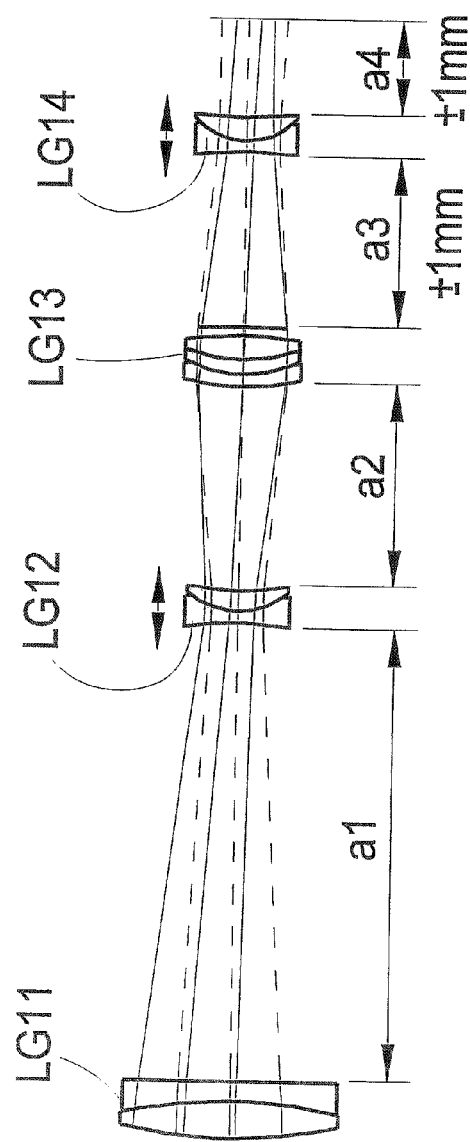
FIG. 2 shows an afocal magnification changer comprising four lens groups LG11 to LG14 with axially displaceable lens group LG14.

FIG. 2 shows a first variant of a magnification changer of the type mentioned above. This is an afocal magnification changer for a magnification range of 12.5× comprising four lens groups LG11 to LG14 with radius r, thickness d, distance a relative to one another, refractive index $n_e$, Abbe number $v_e$ with respect to the wavelength of 546.07 nm according to the following table:

| Plane or lens group | Radius r (mm) | Thickness d (mm) | Variable distance (mm) | Refractive index $n_e$ | Abbe number $v_e$ |
|---|---|---|---|---|---|
| Infinity space to the objective | | | | | |
| LG11 | 55.83000 | 4.50000 | | 1.530190 | 76.58 |
| | −55.83000 | 2.30000 | | 1.584820 | 40.57 |
| | infinity | | | | |
| | | | a1 | | |
| LG12 | −35.22750 | 1.40000 | | 1.747910 | 44.57 |
| | 9.17300 | 2.50000 | | 1.812659 | 25.16 |
| | 25.12050 | | | | |
| | | | a2 | | |
| LG13 | 30.06750 | 1.50000 | | 1.812659 | 25.16 |
| | 15.07000 | 1.80000 | | 1.489140 | 70.23 |
| | 18.96900 | 2.90000 | | 1.716160 | 53.61 |
| | −44.98960 | 1.00000 | | | |
| Diaphragm | infinity | | | | |
| | | | a3 | | |
| LG14 | −47.65660 | 1.30000 | | 1.620680 | 49.54 |
| | 7.94400 | 2.90000 | | 1.624080 | 36.11 |
| | 41.86920 | | | | |
| | | | a4 | | |
| Infinity space to the tube lens | | | | | |

Variable distances a1, a2, a3 and a4 between the individual lens groups LG11 to LG14 are associated with the selected magnifications 4.0×, 1.0× and 0.32× as follows:

| | 4.0× | 1.0× | 0.32× |
|---|---|---|---|
| a1 | 68.657 | 39.472 | 2.098 |
| a2 | 11.189 | 40.373 | 77.747 |
| a3 | 28.039 ± 1 | 12.818 ± 1 | 3.104 ± 1 |
| a4 | 0.016 ± 1 | 15.237 ± 1 | 24.951 ± 1 |

The amounts for distances a3 and a4 already make it clear that in this case a change in distance of the lens group LG14 relative to the rest of the lens groups LG11 to LG13 of ±1 mm can be carried out in each instance without influencing the respective pre-selected magnification. On the other hand, the pre-selection of magnification is carried out by means of axial displacement of lens groups LG12 and LG14 jointly relative to the remaining two lens groups LG11 and LG13.

Figure 3:
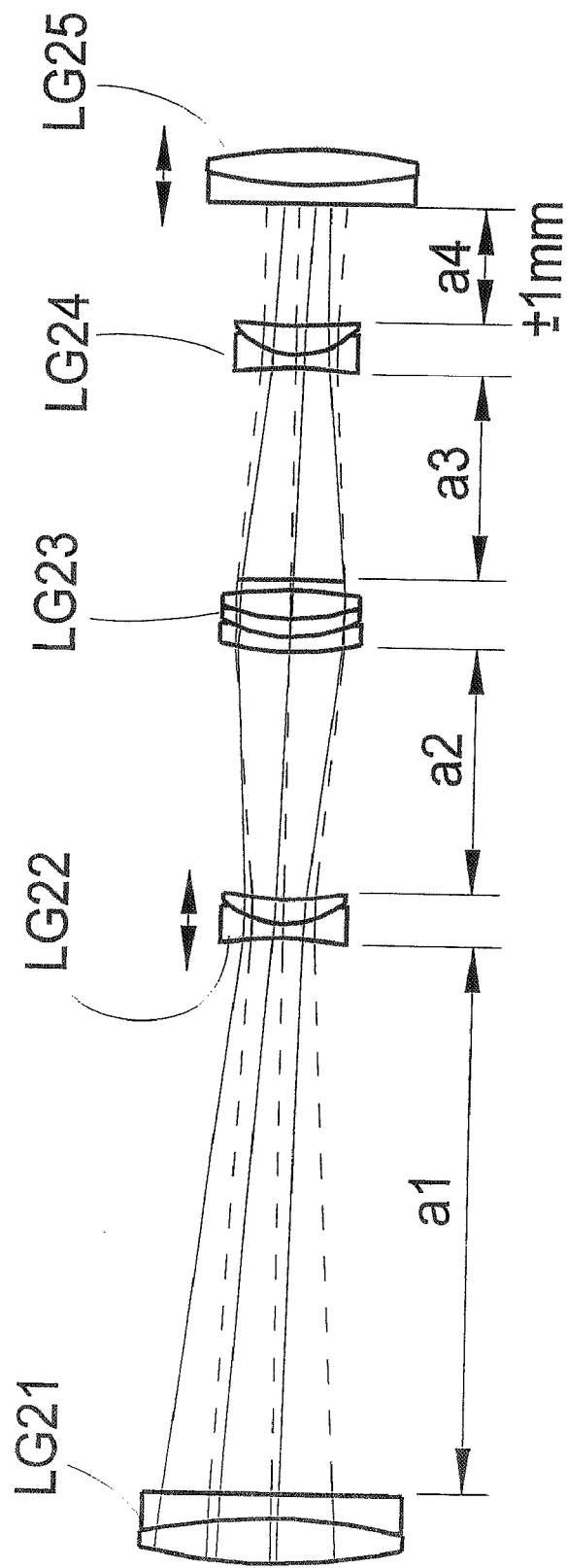
FIG. 3 shows an afocal magnification changer comprising five lens groups LG21 to LG25 with axially displaceable lens group LG25.

FIG. 3 shows another variant of an afocal magnification changer, in this case with a structural length of 130 mm and a magnification range of 20×, comprising five lens groups LG21 to LG25 with radius r, thickness d, distance a relative to one another, refractive index $n_e$, Abbe number $v_e$ with respect to the wavelength of 546.07 nm according to the following table:

| Plane or lens group | Radius r (mm) | Thickness d (mm) | Variable distance (mm) | Refractive index $n_e$ | Abbe number $v_e$ |
|---|---|---|---|---|---|
| Infinity space to the objective | | | | | |
| LG21 | 55.83000 | 4.50000 | | 1.530190 | 76.58 |
| | −55.83000 | 2.30000 | | 1.584820 | 40.57 |
| | infinity | | | | |
| | | | a1 | | |
| LG22 | −29.63900 | 1.40000 | | 1.747910 | 44.57 |
| | 9.57600 | 2.50000 | | 1.812659 | 25.16 |
| | 28.59370 | | | | |
| | | | a2 | | |
| LG13 | 17.66550 | 1.40000 | | 1.708240 | 39.12 |
| | 9.44240 | 3.15000 | | 1.530190 | 76.58 |
| | −30.94640 | 1.00000 | | | |
| Diaphragm | infinity | | | | |
| | | | a3 | | |
| LG24 | −27.97950 | 2.10000 | | 1.812659 | 25.16 |
| | −10.59190 | 1.30000 | | 1.747910 | 44.57 |
| | 38.12900 | | | | |
| | | | a4 | | |
| LG25 | 54.24520 | 2.05000 | | 1.708240 | 39.12 |
| | 33.25480 | 2.28000 | | 1.489140 | 70.23 |
| | infinity | | | | |
| Infinity space to the tube lens | | | | | |

In this magnification changer, magnifications 6.0×, 2.0× and 0.3× are associated with the variable distances a1 to a4 as can be seen from the following table:

| | 6.0× | 2.0× | 0.3× |
|---|---|---|---|
| a1 | 69.713 | 51.441 | 2.608 |
| a2 | 2.034 | 20.306 | 69.139 |
| a3 | 32.226 | 20.448 | 4.346 |
| a4 | 2.047 ± 1 | 13.824 ± 1 | 29.927 ± 1 |
| Infinity space to the tube lens ±1 | | | |

It can be seen from this table that lens group LG25 is displaceable in axial direction by ±1 mm so that the focus position can vary but the respective predetermined magnification remains constant.

With this magnification changer, a change in the focus position which is smaller by a factor of 16 compared with the example described above can be achieved with the same displacement path of ±1 mm. The pre-selection of magnification is carried out by means of axial displacement of lens groups LG22 and LG24 jointly relative to the remaining three lens groups LG21, LG23 and LG25.

Further, it is conceivable that the stereo microscope 1 according to the invention is outfitted with magnification systems instead of magnification changers, each of these magnification systems being designed for a fixedly predetermined magnification which is unalterable per se, wherein the displaceable optical assembly for correcting the focus position is a lens or lens group of a magnification system of this kind.

Figure 4:
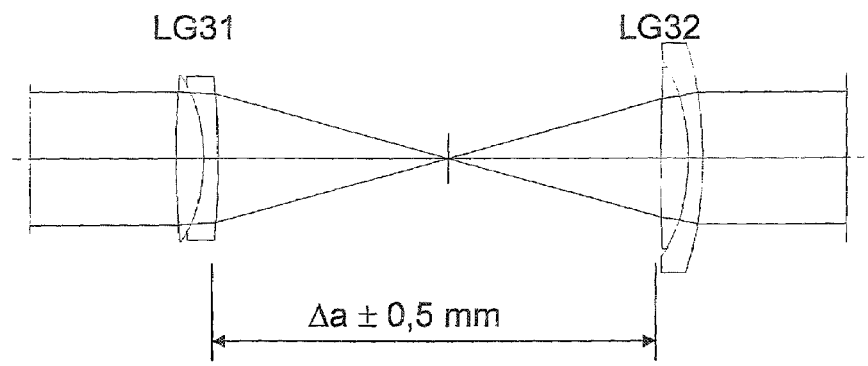
FIG. 4 shows an afocal magnification changer comprising two lens groups LG31 and LG32 with axially displaceable lens group LG32.

A first variant of an afocal magnification system of the kind described above is shown in FIG. 4. It is designed for a magnification of −1× and comprises two lens groups LG31 and LG32 with radius r, thickness d, distance a relative to one another, refractive index $n_e$, Abbe number $v_e$ and focal length f' with respect to the wavelength of 546.07 nm according to the following table:

| Lens group | Radius r (mm) | Thickness d (mm) | Variable distance (mm) | Refractive index $n_e$ | Abbe number $v_e$ | Focal length f' (mm) |
|---|---|---|---|---|---|---|
| Infinity space to the objective | | | | | | |
| LG31 | 42.98863 | 3.80000 | | 1.620680 | 49.5 | 33.5 |
| | −8.19285 | 2.00000 | | 1.652220 | 33.6 | |
| | −32.45360 | | | | | |
| | infinity | 31.90559 | | | | |
| | | | 29.66671 ± 0.5 | | | |
| LG32 | 136.36165 | 3.80000 | | 1.582120 | 53.6 | 33.5 |
| | −9.70164 | 2.00000 | | 1.723079 | 29.4 | |
| | −18.12777 | | | | | |
| | | | ±0.5 | | | |
| Infinity space to the tube lens | | | | | | |

In this case, lens group LG32 is displaceable relative to lens group LG31 within a length range of ±0.5 mm extending in axial direction. Again, the focus position can change, but this change has no influence on the magnification that is predetermined by this magnification system.

Figure 5:
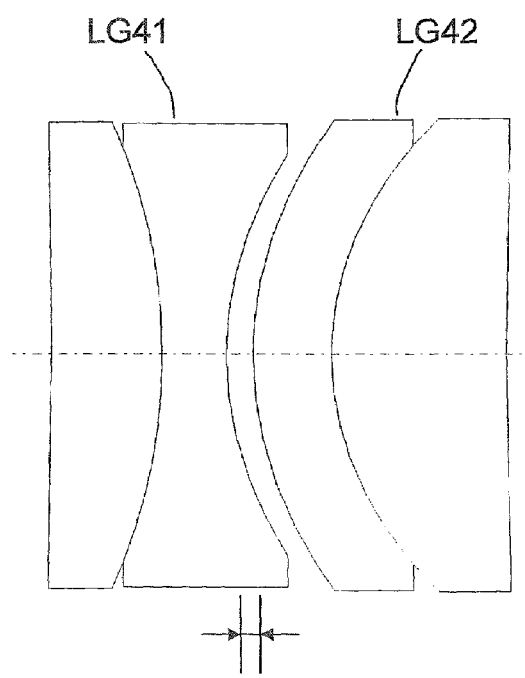
FIG. 5 shows an afocal magnification changer comprising two lens groups LG41 and LG42 with axially displaceable lens group LG42.

FIG. 5 shows another variant of an afocal magnification system of this kind which, in this case, is designed for a magnification of 1×. It again comprises two lens groups LG41 and LG42 but in this case with radius r, thickness d, distance a relative to one another, refractive index $n_e$, Abbe number $v_e$ and focal length f' with respect to the wavelength of 546.07 nm according to the following table:

In this case, lens group LG42 is displaceable relative to lens group LG41 again within a length range of ±0.5 mm extending in axial direction. While the focus position changes, the magnification that is predetermined by this magnification system does not.

Figure 6:
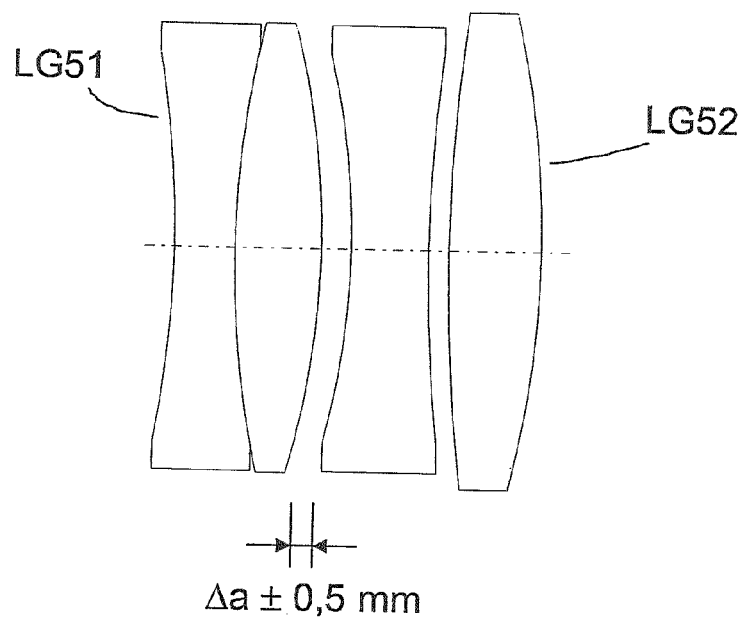
FIG. 6 shows an afocal magnification changer comprising two lens groups LG51 and LG52 with axially displaceable lens group LG52.

A third variant of an afocal magnification system of fixed magnification with a displaceable assembly is shown FIG. 6. In this case, the magnification is 0.87×, the two lens groups LG51 and LG52 have radius r, thickness d, distance a relative to one another, refractive index $n_e$, Abbe number $v_e$ and focal length f' with respect to the wavelength of 546.07 nm according to the following table:

| Lens group | Radius r (mm) | Thickness d (mm) | Variable distance (mm) | Refractive index $n_e$ | Abbe number $v_e$ | Focal length f' (mm) |
|---|---|---|---|---|---|---|
| Infinity space to the objective | | | | | | |
| LG41 | −227.78200 | 2.50000 | | 1.761639 | 27.2 | −22.9 |
| | −18.41300 | 1.50000 | | 1.616640 | 44.3 | |
| | 11.78000 | | | | | |
| | | | 0.60142 ± 0.5 | | | |
| LG42 | 12.22100 | 1.80000 | | 1.723079 | 29.4 | 21.1 |
| | 9.85800 | 4.00000 | | 1.622470 | 63.2 | |
| | 227.78200 | | | | | |
| | | | ±0.5 | | | |
| Infinity space to the tube lens | | | | | | |

| Lens group | Radius r (mm) | Thickness d (mm) | Variable distance (mm) | Refractive index $n_e$ | Abbe number $v_e$ | Focal length (mm) |
|---|---|---|---|---|---|---|
| Infinity space to the objective | | | | | | |
| LG51 | −24.10700 | 2.00000 | | 1.591420 | 61 | |
| | 23.71440 | 2.80000 | | 1.723079 | 29.4 | 50.2 |
| | −19.81190 | 0.98374 | | | | |
| | −18.36100 | 2.50000 | | 1.761639 | 27.2 | −16.3 |
| | 40.62800 | | | | | |
| | | | 0.57591 ± 0.5 | | | |
| LG52 | 45.31600 | 3.00000 | | 1.591420 | 61 | 26.6 |
| | −23.5100 | | | | | 33.5 |
| | | | ±0.5 | | | |
| Infinity space to the tube lens | | | | | | |

By displacing lens group LG52 relative to lens group LG51 by ±0.5 mm in axial direction, the focus point can be varied but the predetermined magnification remains the same.

Figure 7:
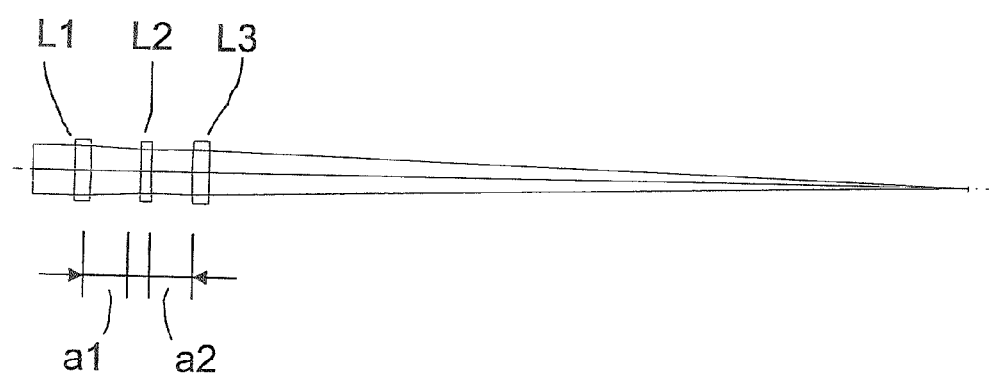
FIG. 7 shows a tube lens system with changeable transmission length comprising three lenses L1 to L3 with axially displaceable lens L2.

FIG. 7 shows another possibility for the construction of the stereo microscope 1 according to the invention. In this case, the stereo microscope 1 is outfitted in each imaging beam path 4.1, 4.2 with a tube lens system 6.1, 6.2 with changeable transmission length, and the displaceable optical assemblies are lenses or lens groups of this tube lens system. The tube lens system 6.1, 6.2 comprises, for example, lenses L1 to L3 with radius r, thickness d, distance a relative to one another, refractive index $n_e$, Abbe number $v_e$, and focal length f' with respect to the wavelength of 546.07 nm according to the following table:

| Lens | Radius r (mm) | Thickness d (mm) | Variable distance a (mm) | Refractive index $n_e$ | Abbe number $v_e$ | Focal length f' |
|---|---|---|---|---|---|---|
| L1 | 273.65 | 4.0 | | 1.622470 | 63.19 | 122.00 |
| | −104.52 | | | | | |
| | | | 11 ± 9 | | | |
| L2 | −272.80 | 2.5 | | 1.584820 | 40.56 | −87.48 |
| | 63.18 | | | | | |
| | | | 10 ± 9 | | | |
| L3 | 81.92 | 4.0 | | 1.622470 | 63.19 | 131.00 |
| | infinity | | | | | |
| | | | 181.66 ± 23.4 | | | |
| Receiver surface | | | | | | |

In this case, lenses L1 and L3 are fixedly connected to one another and are displaceable relative to lens L2.

Figure 8:
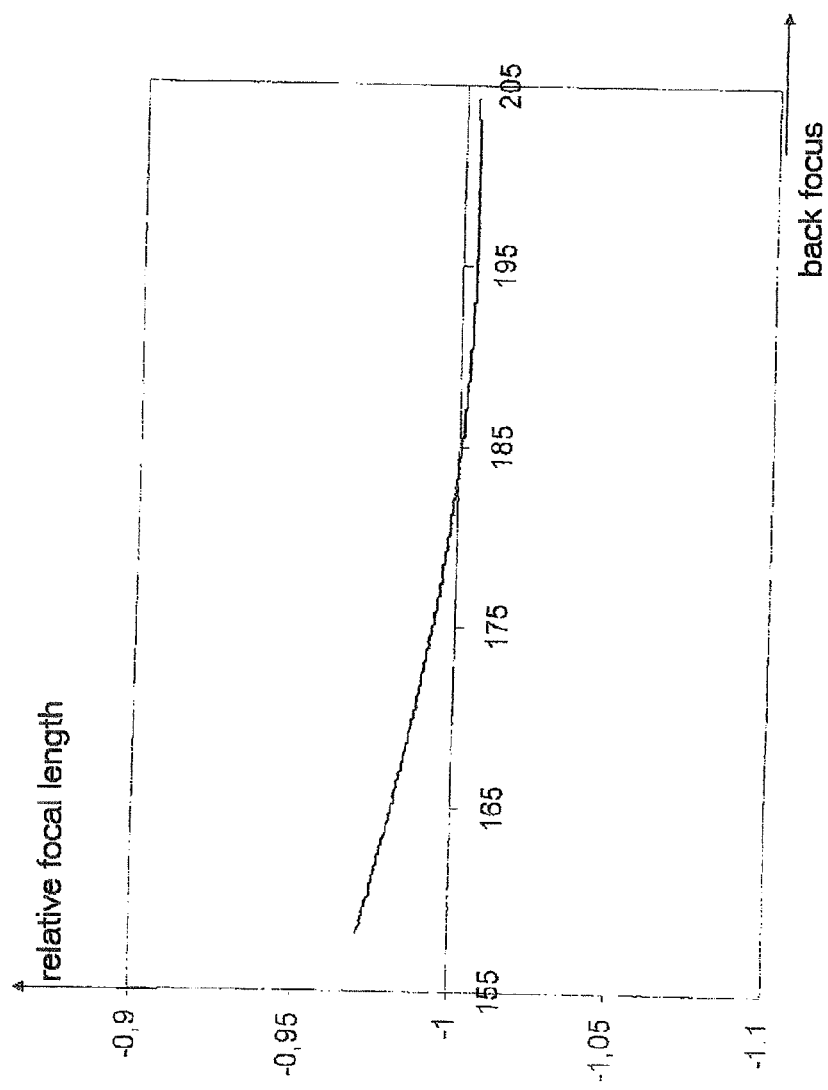
FIG. 8 is a graph illustrating the relation of focal length to the center position of the movement range of the displaceable lens L2 from FIG. 7.
Figure 9:
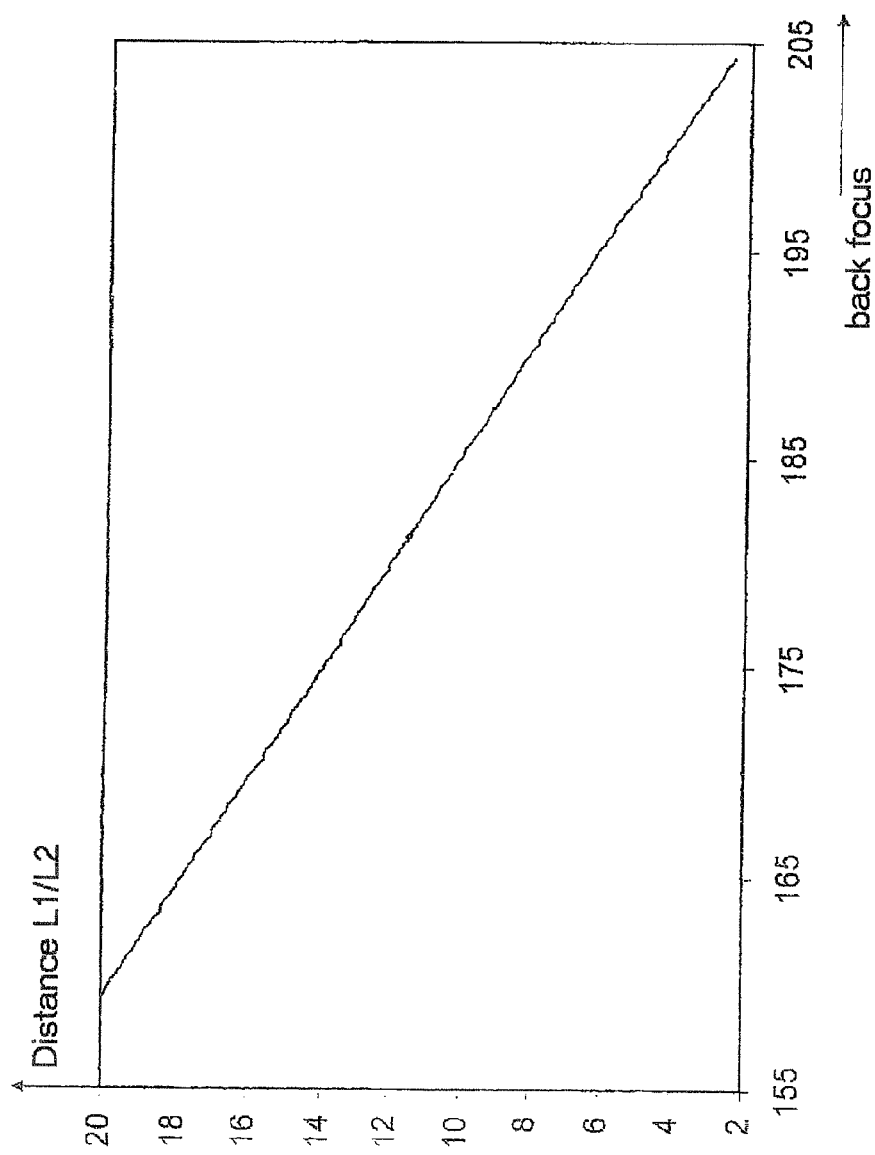
FIG. 9 is a graph illustrating the required adjustment of the distance of lens L1 from lens L2 from FIG. 7 to achieve the back focus distance from lens L3 to the receiver surface.

For purposes of explanation, the graph in FIG. 8 shows the relative focal length to the center position of the movement range. The adjustment of the distance from L1 to L2 that is necessary for achieving the back focus distance from L3 to the receiver surface can be seen from the graph in FIG. 9. An object which is displaced by ΔZ relative to the object plane of the system creates an image in the optical space in front of the tube lens, which image lies near infinity with back focus $s'_1$. The tube lens can be adjusted in such a way that this image is imaged in the receiver surface.

The length range in which the lenses L1, L3 and lens L2 are displaceable relative to one another is ±9 mm. It does not matter whether the two lenses L1 and L2 are fixedly arranged and lens L2 is displaced or vice versa.

In the indicated embodiment example, the tube magnification is about 1+0.00002*Δs'. The error is negligibly small relative to the measurement quantities and can be calibrated out of the measured values if required.

While the foregoing description and drawings represent the present invention, it will be obvious to those skilled in the art that various changes may be made therein without departing from the true spirit and scope of the present invention.

| Reference Numbers | |
|---|---|
| 1 | stereo microscope |
| 2 | object |
| 3 | objective |
| 4.1, 4.2 | imaging beam paths |
| 5.1, 5.2 | magnification changers |
| 6.1, 6.2 | tube lens systems |
| 7 | receiver surface |
| L | lenses |
| LG | lens groups |

What is claimed is:

1. An optical arrangement for imaging depth-structured objects comprising:
   at least one afocal magnification changer;
   an entrance pupil in front of the at least one afocal magnification changer;
   an aperture diaphragm;
   a receiver surface positioned in the imaging beam path;
   at least one optical assembly which is displaceable in axial direction being provided between the aperture diaphragm and the receiver surface; and
   displacement of said optical assembly within a predetermined length range causing a change in focus position while the magnification remains the same;
   wherein the entrance pupil is located in a non-telecentric position; and
   wherein the optical arrangement is constructed to generate images from different observation planes at different depth levels of an object.

2. The optical arrangement according to claim 1, wherein stereo microscope carries out the generation of images from different observation planes at different depth levels of an object.

3. The optical arrangement according to claim 1, wherein the displaceable optical assemblies are lenses or lens groups of the magnification changers.

4. The optical arrangement according to claim 3, wherein the afocal magnification changers are for a magnification range of 12.5× and comprise, respectively, four lens groups LG11 to LG14 with radius r, thickness d, distance a relative to one another, refractive index ne, Abbe number ve with respect to the wavelength of 546.07 nm:

| Plane or lens group | Radius r (mm) | Thickness d (mm) | Variable distance (mm) | Refractive index $n_e$ | Abbe number $v_e$ |
|---|---|---|---|---|---|
| Infinity space to the objective | | | | | |
| LG11 | 55.83000 | 4.50000 | | 1.530190 | 76.58 |
| | −55.83000 | 2.30000 | | 1.584820 | 40.57 |
| | infinity | | | | |
| | | | a1 | | |
| LG12 | −35.22750 | 1.40000 | | 1.747910 | 44.57 |
| | 9.17300 | 2.50000 | | 1.812659 | 25.16 |
| | 25.12050 | | | | |
| | | | a2 | | |
| LG13 | 30.06750 | 1.50000 | | 1.812659 | 25.16 |
| | 15.07000 | 1.80000 | | 1.489140 | 70.23 |

-continued

| Plane or lens group | Radius r (mm) | Thickness d (mm) | Variable distance (mm) | Refractive index $n_e$ | Abbe number $v_e$ |
|---|---|---|---|---|---|
| | 18.96900 | 2.90000 | | 1.716160 | 53.61 |
| | −44.98960 | 1.00000 | | | |
| Diaphragm | infinity | | | | |
| | | | a3 | | |
| LG14 | −47.65660 | 1.30000 | | 1.620680 | 49.54 |
| | 7.94400 | 2.90000 | | 1.624080 | 36.11 |
| | 41.86920 | | | | |
| | | | a4 | | |
| Infinity space to the tube lens | | | | | | with the following magnifications associated with the variable distances:

| | 4.0× | 1.0× | 0.32× |
|---|---|---|---|
| a1 | 68.657 | 39.472 | 2.098 |
| a2 | 11.189 | 40.373 | 77.747 |
| a3 | 28.039 ± 1 | 12.818 ± 1 | 3.104 ± 1 |
| a4 | 0.016 ± 1 | 15.237 ± 1 | 24.951 ± 1 | wherein lens group LG14 is displaceable by about ±1 mm within a length range extending in axial direction without causing a change in the magnification predetermined by this magnification changer.

5. The optical arrangement according to claim 3, with afocal magnification changers (5.1, 5.2) with a structural length of 130 mm and a magnification range of 20×, each comprising five lens groups LG21 to LG25 with radius r, thickness d, distance a relative to one another, refractive index ne, Abbe number ve with respect to the wavelength of 546.07 nm:

| Plane or lens group | Radius r (mm) | Thickness d (mm) | Variable distance (mm) | Refractive index $n_e$ | Abbe number $v_e$ |
|---|---|---|---|---|---|
| Infinity space to the objective | | | | | |
| LG21 | 55.83000 | 4.50000 | | 1.530190 | 76.58 |
| | −55.83000 | 2.30000 | | 1.584820 | 40.57 |
| | infinity | | | | |
| | | | a1 | | |
| LG22 | −29.63900 | 1.40000 | | 1.747910 | 44.57 |
| | 9.57600 | 2.50000 | | 1.812659 | 25.16 |
| | 28.59370 | | | | |
| | | | a2 | | |
| LG13 | 17.66550 | 1.40000 | | 1.708240 | 39.12 |
| | 9.44240 | 3.15000 | | 1.530190 | 76.58 |
| | −30.94640 | 1.00000 | | | |
| Diaphragm | infinity | | | | |
| LG24 | −27.97950 | 2.10000 | | 1.812659 | 25.16 |
| | −10.59190 | 1.30000 | | 1.747910 | 44.57 |
| | 38.12900 | | | | |
| | | | a4 | | |
| LG25 | 54.24520 | 2.05000 | | 1.708240 | 39.12 |
| | 33.25480 | 2.28000 | | 1.489140 | 70.23 |
| | infinity | | | | |
| Infinity space to the tube lens | | | | | | with the following magnifications associated with the variable distances:

|  | 6.0× | 2.0× | 0.3× |
|---|---|---|---|
| a1 | 69.713 | 51.441 | 2.608 |
| a2 | 2.034 | 20.306 | 69.139 |
| a3 | 32.226 | 20.448 | 4.346 |
| a4 | 2.047 ± 1 | 13.824 ± 1 | 29.927 ± 1 |
| Infinity space to the tube lens ±1 | | | | wherein lens group LG25 is displaceable by about ±1 mm within a length range extending in axial direction without causing a change in the magnification predetermined by this magnification changer.

6. The optical arrangement according to claim 1, wherein afocal magnification systems are provided for a determined magnification, and the displaceable optical assemblies are lenses or lens groups of these magnification systems.

7. The optical arrangement according to claim 6, with afocal magnification systems for a magnification of −1×, each comprising two lens groups LG31 and LG32 with radius r, thickness d, distance a relative to one another, refractive index ne, Abbe number ve and focal length f' with respect to the wavelength of 546.07 nm:

| Lens group | Radius r (mm) | Thickness d (mm) | Variable distance (mm) | Refractive index $n_e$ | Abbe number $v_e$ | Focal length f' (mm) |
|---|---|---|---|---|---|---|
| Infinity space to the objectiv | | | | | | |
| LG31 | 42.98863 | 3.80000 | | 1.620680 | 49.5 | 33.5 |
|  | −8.19285 | 2.00000 | | 1.652220 | 33.6 | |
|  | −32.45360 | | | | | |
|  | infinity | 31.90559 | | | | |
|  | | | 29.66671 ± 0.5 | | | |
| LG32 | 136.36165 | 3.80000 | | 1.582120 | 53.6 | 33.5 |
|  | −9.70164 | 2.00000 | | 1.723079 | 29.4 | |
|  | −18.12777 | | | | | |
|  | | | ±0.5 | | | |
| Infinity space to the tube lens | | | | | | | wherein lens group LG32 is displaceable relative to lens group LG31 within a length range of about ±0.5 mm extending in axial direction without causing a change in the magnification that is predetermined by this magnification system.

8. The optical arrangement according to claim 6, with afocal magnification systems for a magnification of 1×, each comprising two lens groups LG41 and LG42 with radius r, thickness d, distance a relative to one another, refractive index ne, Abbe number ve and focal length f' with respect to the wavelength of 546.07 nm:

| Lens group | Radius r (mm) | Thickness d (mm) | Variable distance (mm) | Refractive index $n_e$ | Abbe number $v_e$ | Focal length (mm) |
|---|---|---|---|---|---|---|
| Infinity space to the objective | | | | | | |
| LG41 | −227.78200 | 2.50000 | | 1.761639 | 27.2 | −22.9 |
|  | −18.41300 | 1.50000 | | 1.616640 | 44.3 | |
|  | 11.78000 | | | | | |
|  | | | 0.60142 ± 0.5 | | | |
| LG42 | 12.22100 | 1.80000 | | 1.723079 | 29.4 | 21.1 |
|  | 9.85800 | 4.00000 | | 1.622470 | 63.2 | |
|  | 227.78200 | | | | | |
|  | | | ±0.5 | | | |
| Infinity space to the tube lens | | | | | | | wherein lens group LG42 is displaceable relative to lens group LG41 within a length range of about ±0.5 mm extending in axial direction without causing a change in the magnification that is predetermined by this magnification system.

9. The optical arrangement according to claim 6, with afocal magnification systems for a magnification of 0.87×, each comprising two lens groups LG51 and LGS52 with radius r, thickness d, distance a relative to one another, refractive index ne, Abbe number ve and focal length f' with respect to the wavelength of 546.07 nm:

| Lens group | Radius r (mm) | Thickness d (mm) | Variable distance (mm) | Refractive index $n_e$ | Abbe number $v_e$ | Focal length (mm) |
|---|---|---|---|---|---|---|
| Infinity space to the objective | | | | | | |
| LG51 | −24.10700 | 2.00000 | | 1.591420 | 61 | 50.2 |
| | 23.71440 | 2.80000 | | 1.723079 | 29.4 | −16.3 |
| | −19.81190 | | | | | |
| | | 0.98374 | | | | |
| | −18.36100 | 2.50000 | | 1.761639 | 27.2 | |
| | 40.62800 | | | | | |
| | | | 0.57591 ± 0.5 | | | |
| LG52 | 45.31600 | 3.00000 | | 1.591420 | 61 | 26.6 |
| | −23.5100 | | | | | 33.5 |
| | | | ±0.5 | | | |
| Infinity space to the tube lens | | | | | | | wherein lens group LG52 is displaceable relative to lens group LG51 within a length range of about ±0.5 mm extending in axial direction without causing a change in the magnification that is predetermined by this magnification system.

10. The optical arrangement according to claim 1, with tube lens systems with changeable transmission length, wherein the displaceable optical assemblies are lenses or lens groups of these tube lens systems.

11. The optical arrangement according to claim 10, with tube lens systems, comprising lenses L1 to L3 with radius r, thickness d, distance a relative to one another, refractive index ne, Abbe number ve with respect to the wavelength of 546.07 nm:

| Lens | Radius r (mm) | Thickness d (mm) | Variable distance a (mm) | Refractive index $n_e$ | Abbe number $v_e$ | Focal length f' |
|---|---|---|---|---|---|---|
| L1 | 273.65 | 4.0 | | 1.622470 | 63.19 | 122.00 |
| | −104.52 | | | | | |
| | | | 11 ± 9 | | | |
| L2 | −272.80 | 2.5 | | 1.584820 | 40.56 | −87.48 |
| | 63.18 | | | | | |
| | | | 10 ± 9 | | | |
| L3 | 81.92 | 4.0 | | 1.622470 | 63.19 | 131.00 |
| | infinity | | | | | |
| | | | 181.66 ± 23.4 | | | |
| Receiver surface | | | | | | | wherein the total transmission length of the tube lens system and, therefore, the focus position and focusing on the receiver surface changes when the combination formed of lenses L1 and L3 on one hand and lens L2 on the other hand are displaced relative to one another in axial direction within a length range of ±9 mm without causing a change in the predetermined magnification.

12. A method for calibrating the imaging of depth-structured objects using the optical arrangement indicated in claim 1, comprising the steps of:

recording a series of images from different object distances for determining the change in the image geometry;

placing the object at different distances from the optical arrangement for this purpose; and compensating for defocusing that is present after the adjustment of an object distance diverging from a preceding adjustment by displacing the optical assemblies.

13. The method for recording a series of images of objects of an object plane, which images have longitudinal chromatic aberrations, using the arrangement indicated in claim 1, wherein a series of images is recorded at the same object distance successively in time and in a wavelength-selective manner, wherein the optical assemblies are displaced for purposes of compensating a defocusing associated with a determined wavelength.

* * * * *